(12) United States Patent
Kim

(10) Patent No.: US 7,959,235 B2
(45) Date of Patent: Jun. 14, 2011

(54) ECCENTRIC WHEEL APPARATUS FOR ROCKING BICYCLE

(76) Inventor: Man Seob Kim, Incheon (KR)

( * ) Notice: Subject to any disclaimer, the term of this patent is extended or adjusted under 35 U.S.C. 154(b) by 413 days.

(21) Appl. No.: 11/577,806

(22) PCT Filed: Oct. 25, 2005

(86) PCT No.: PCT/KR2005/003553
§ 371 (c)(1),
(2), (4) Date: May 22, 2009

(87) PCT Pub. No.: WO2006/046823
PCT Pub. Date: May 4, 2006

(65) Prior Publication Data
US 2009/0236901 A1 Sep. 24, 2009

(30) Foreign Application Priority Data
Oct. 26, 2004 (KR) .......................... 10-2004-0085909

(51) Int. Cl.
*B60B 27/00* (2006.01)
*B62M 1/00* (2010.01)

(52) U.S. Cl. ...................... 301/5.1; 301/110.5; 280/229

(58) Field of Classification Search ................ 301/1, 5.1, 301/105.1, 110.5; 280/229; 74/571.1, 571.11
See application file for complete search history.

(56) References Cited

U.S. PATENT DOCUMENTS

| | | | | |
|---|---|---|---|---|
| 3,717,361 | A * | 2/1973 | Vanderpool | 280/229 |
| 3,817,120 | A * | 6/1974 | Clay | 301/1 |
| 4,755,005 | A * | 7/1988 | Tsai | 301/1 |
| 6,186,918 | B1 * | 2/2001 | Yoo | 474/112 |
| 6,371,571 | B1 * | 4/2002 | Tsan | 301/110.5 |
| 7,240,969 | B2 * | 7/2007 | Gu | 301/5.1 |

FOREIGN PATENT DOCUMENTS

| | | |
|---|---|---|
| EP | 0 155 808 | 9/1985 |
| EP | 155808 A2 * | 9/1985 |

* cited by examiner

*Primary Examiner* — Russell D Stormer
(74) *Attorney, Agent, or Firm* — Berenato & White, LLC

(57) ABSTRACT

The eccentric wheel apparatus includes a rotating frame, a wheel frame, and a circular adjustment member. Here, the inner portion of a cylindrical body is isolated by an isolation plate and an axial tube to which a driving shaft is fixed is eccentrically formed via the isolation place, in the rotating frame. Accordingly, the rotating frame and the wheel frame are combined with or released from each other. In the case that the rotating frame and the wheel frame are released from each other, the wheel frame can be freely eccentrically adjusted.

5 Claims, 7 Drawing Sheets

[Fig. 1]
PRIOR ART
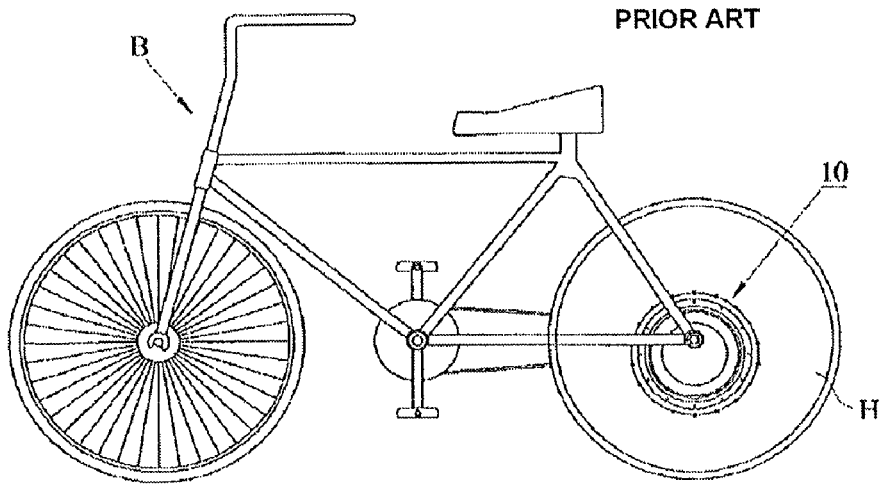
[Fig. 2]
PRIOR ART
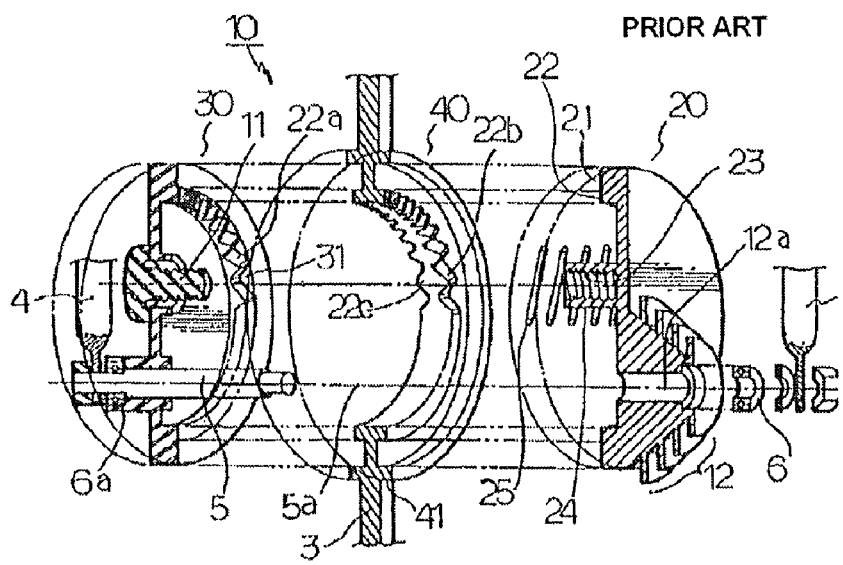
[Fig. 3]
PRIOR ART
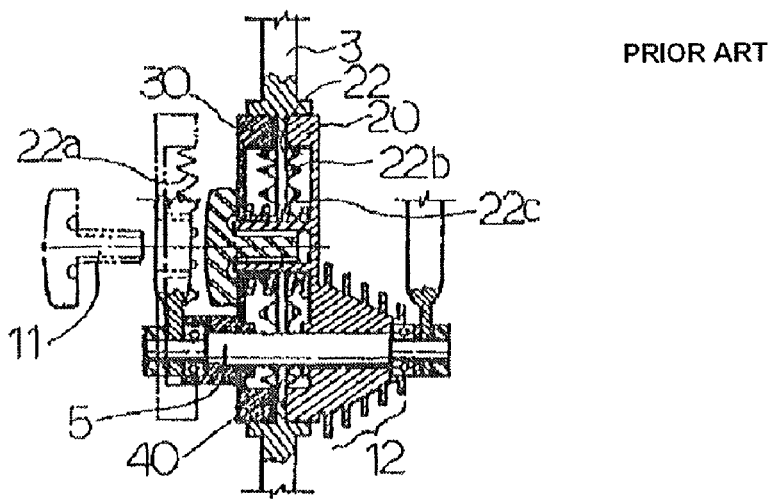

[Fig. 4]
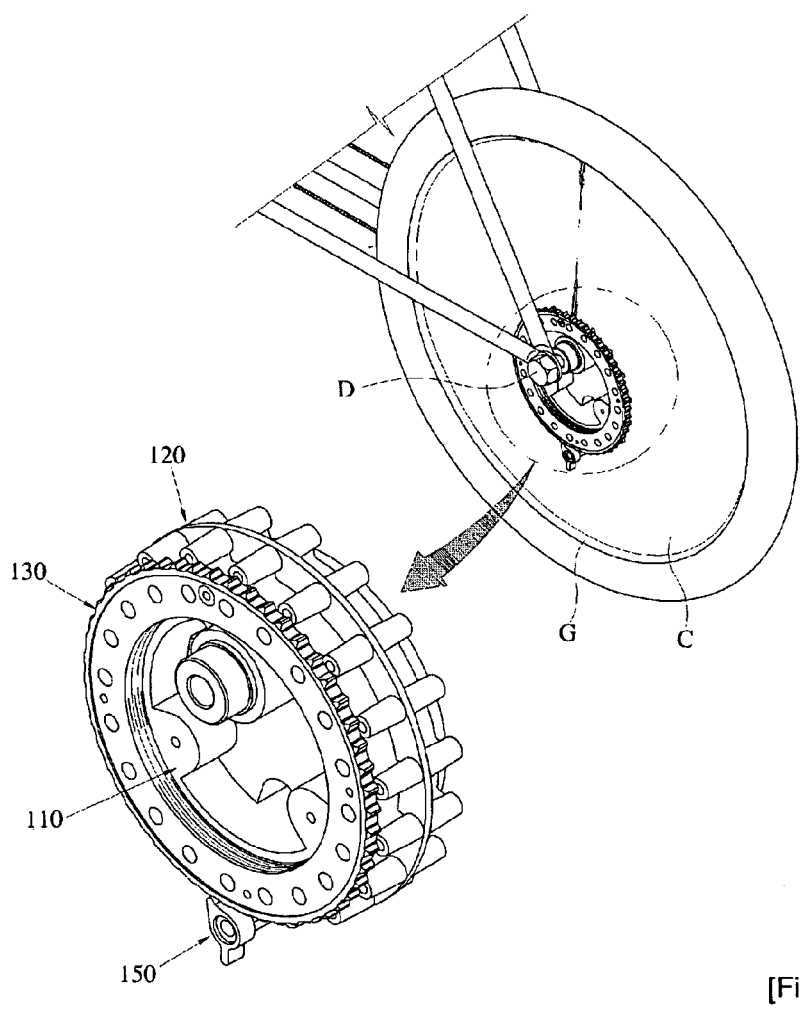
[Fig. 5]
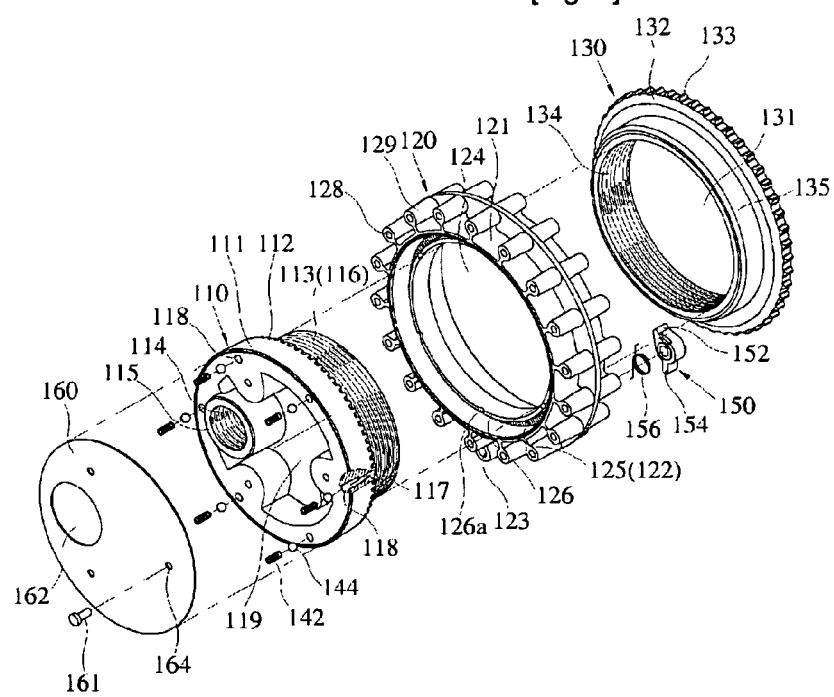

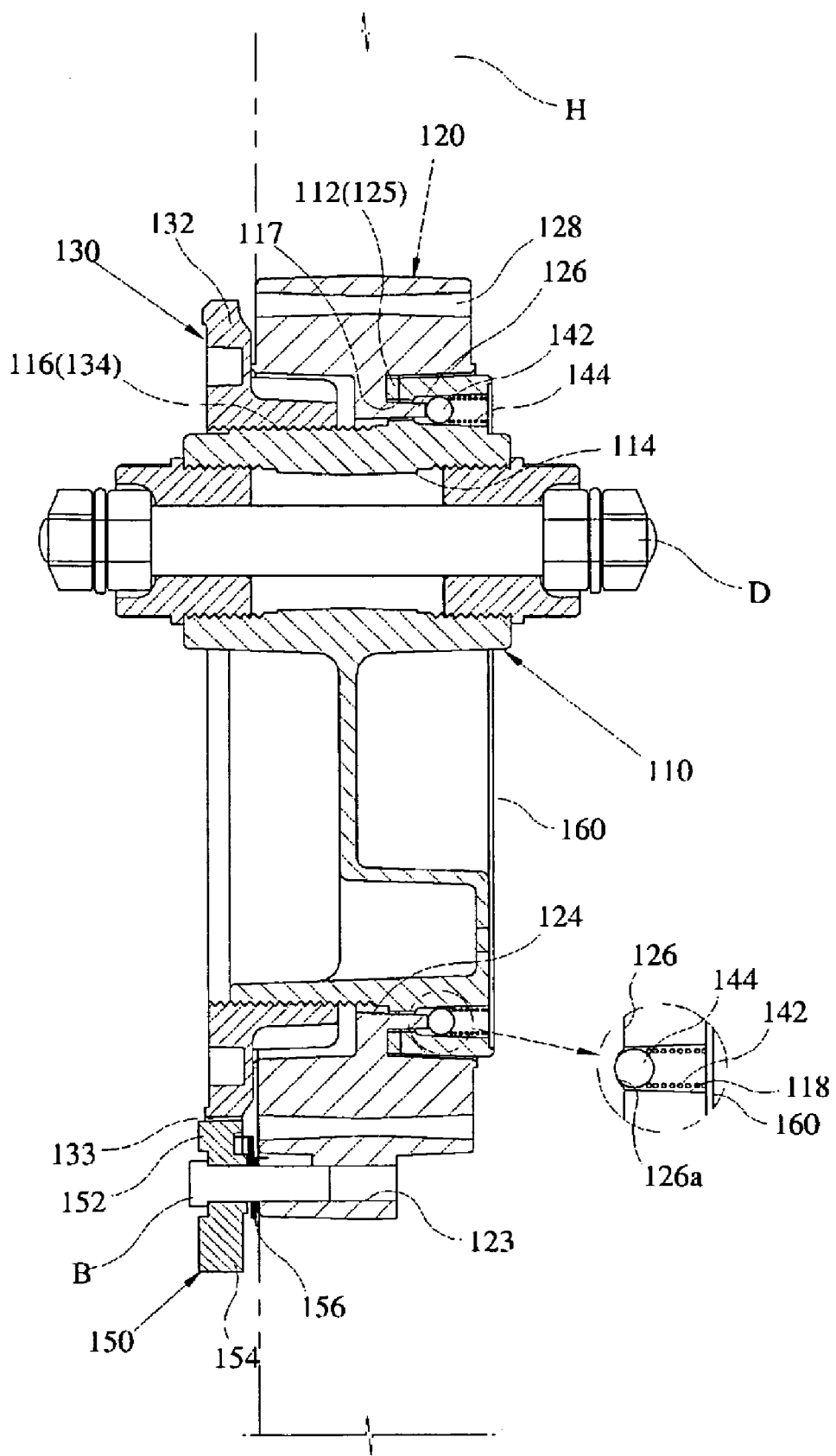
[Fig. 6]

[Fig. 7]
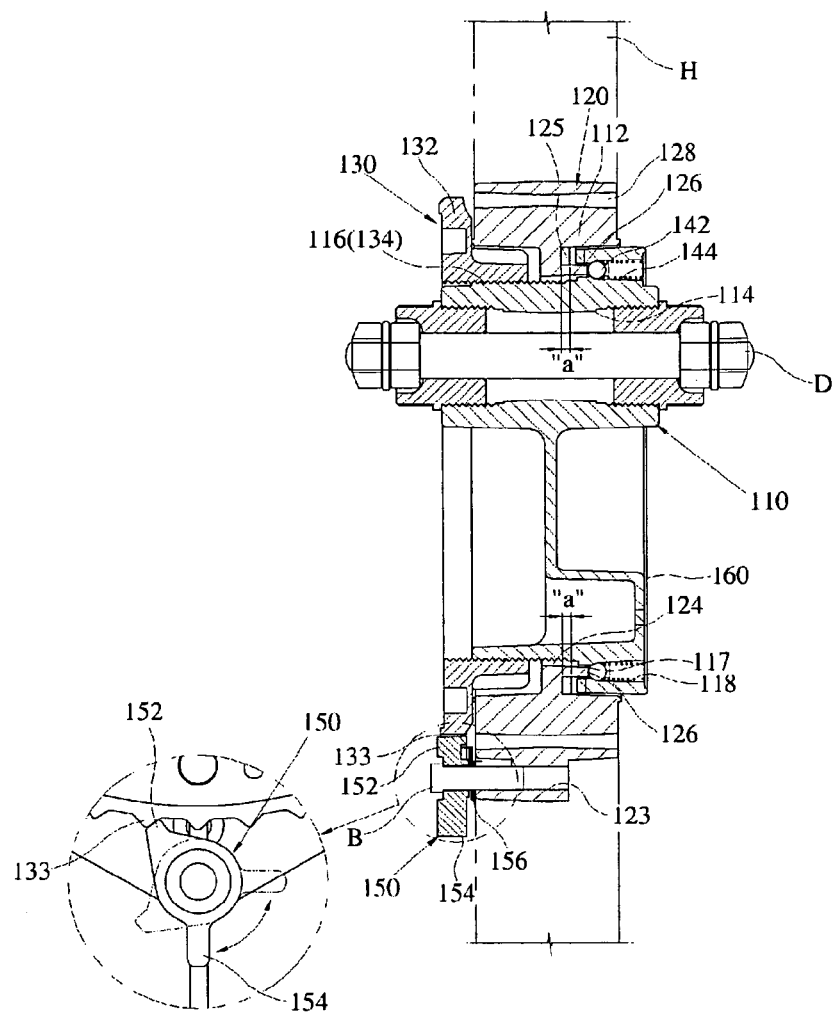
[Fig. 8]
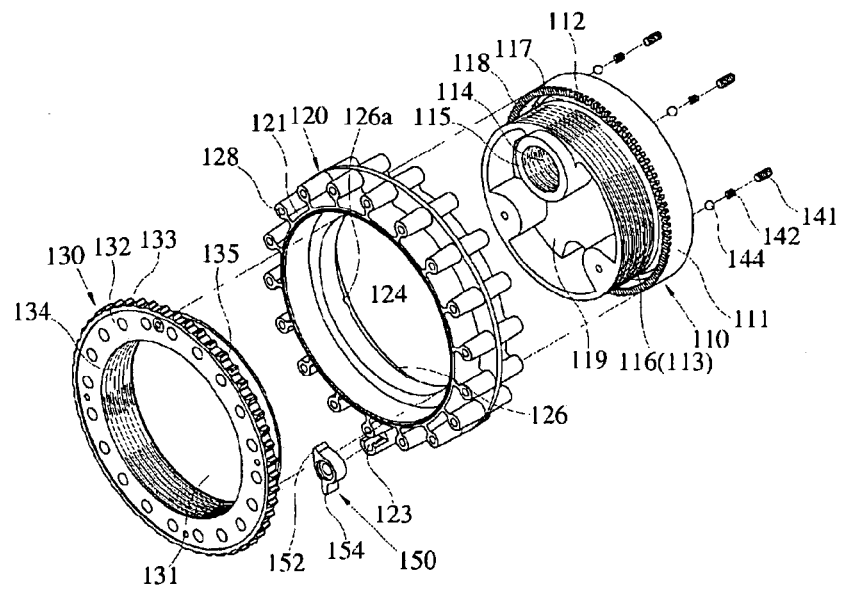

[Fig. 9]
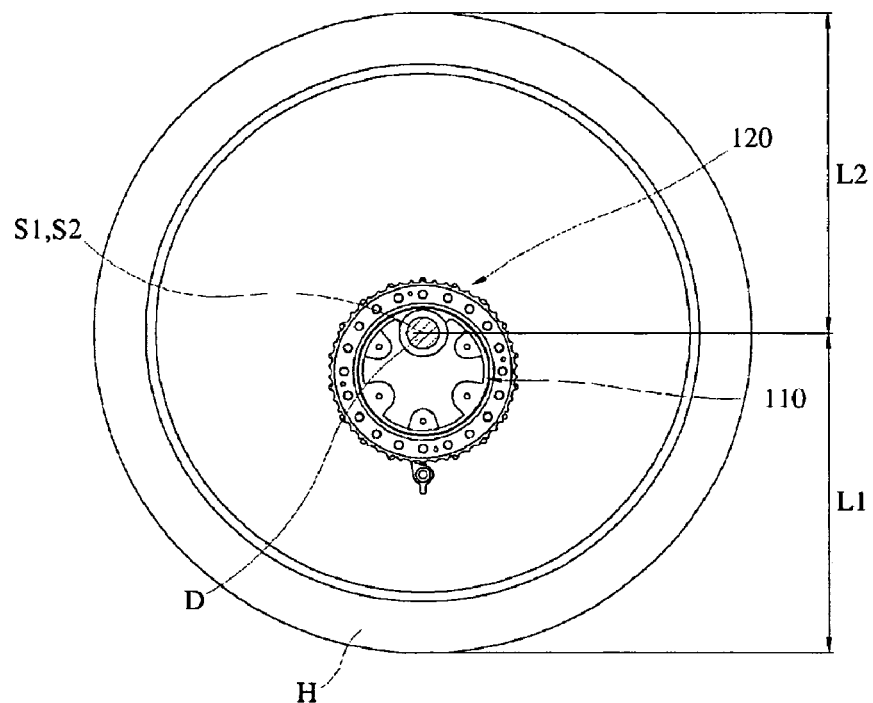
[Fig. 10]
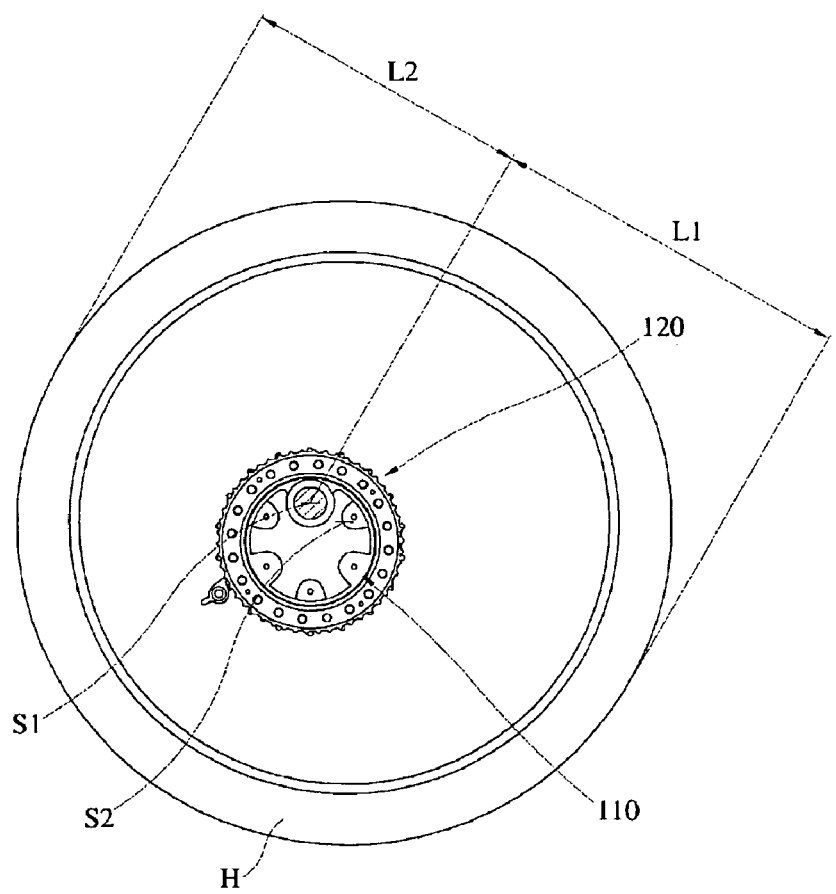

[Fig. 11]
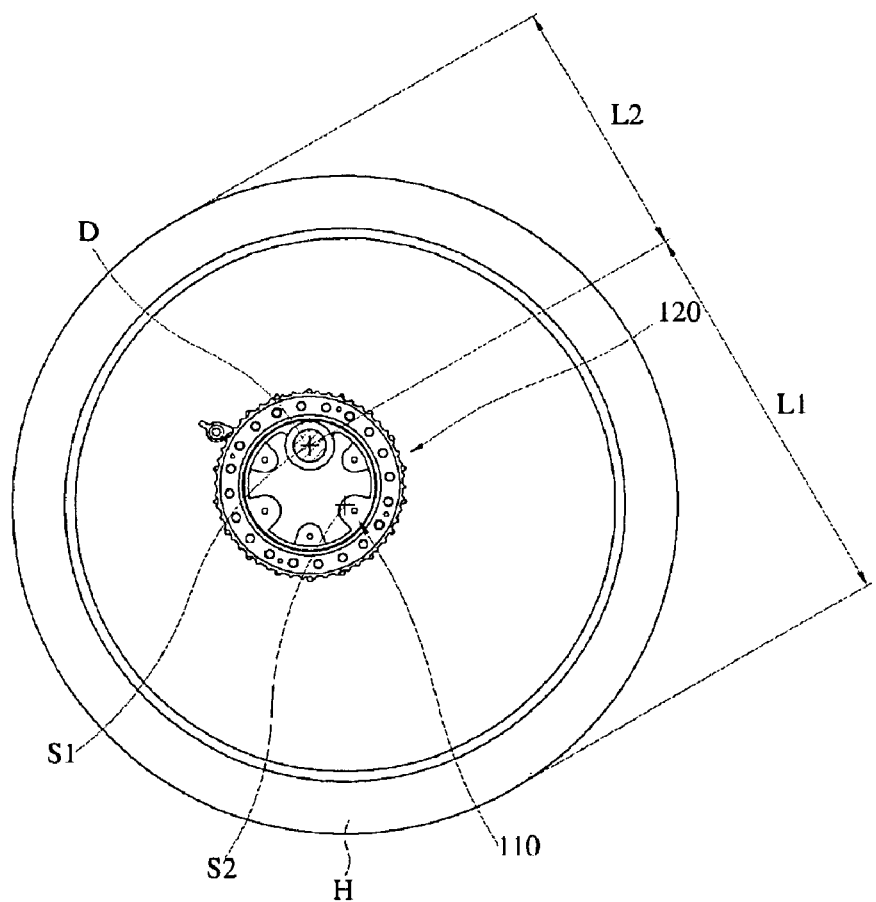
[Fig. 12]
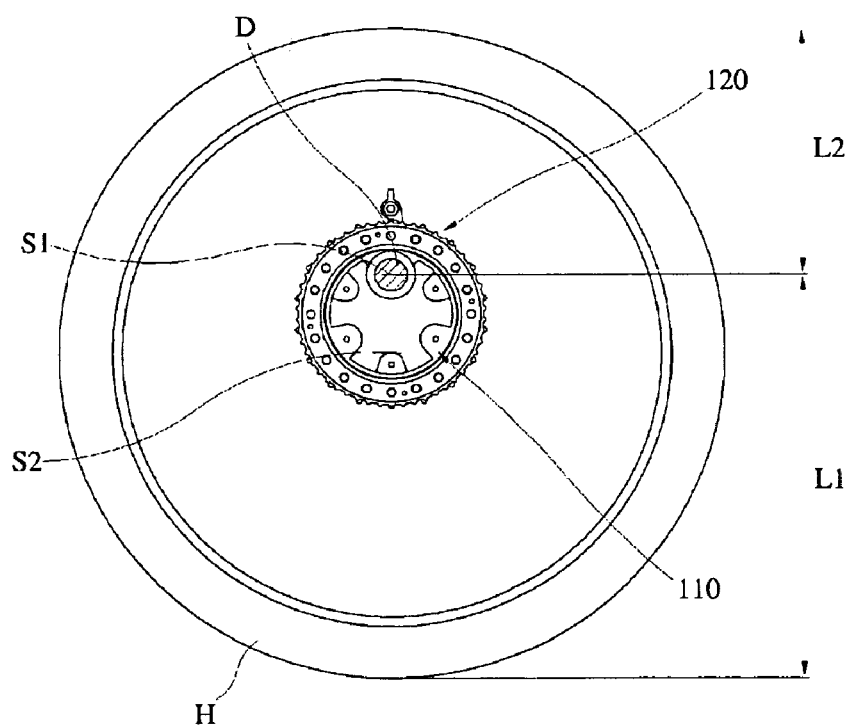

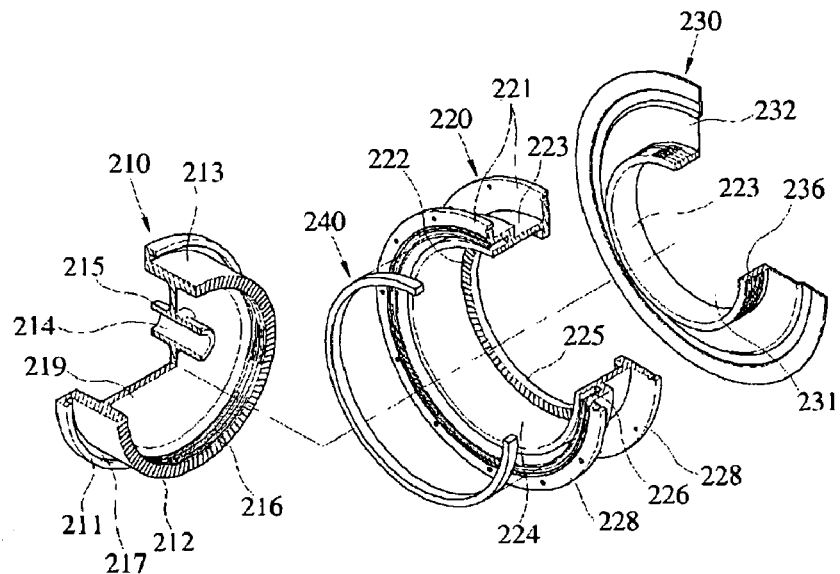
[Fig. 13]
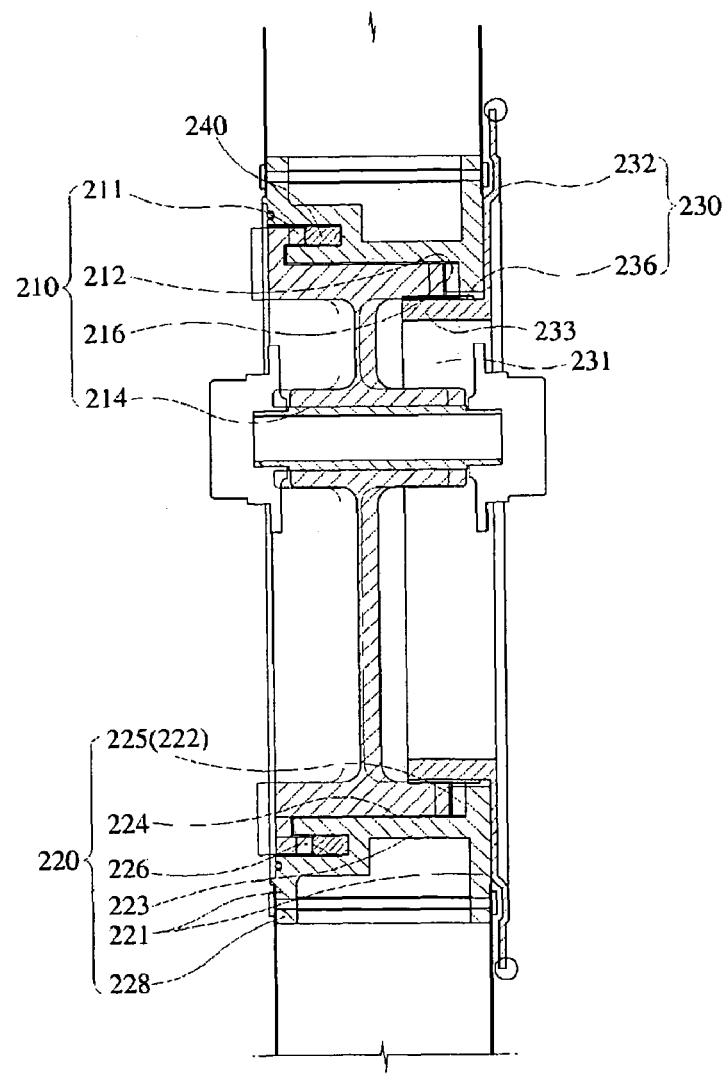
[Fig. 14]

ECCENTRIC WHEEL APPARATUS FOR ROCKING BICYCLE

TECHNICAL FIELD

The present invention relates to an eccentric wheel apparatus for a rocking bicycle in which the axis of the eccentric wheel apparatus is eccentrical with the central driving shaft thereof and thus the shaft is shaken up and down during running of the wheel, and more particularly, to an eccentric wheel apparatus for a rocking bicycle which can be employed in a general bicycle by adjusting a shaking degree, and of which shaking width of a variety of eccentric angles can be adjusted.

BACKGROUND ART

Conventional rocking bicycles have been known in which each driving shaft of a front wheel and rear wheel is eccentrical with the central axis of each wheel, and thus the wheels can be shaken up and down during running.

FIG. 1 is a side view showing an example of a conventional rocking bicycle, which is disclosed in a Korean Utility Model Registration Publication No. 183508 in the name of the same applicant as that of this invention.

Referring to FIGS. 2 and 3, a corresponding eccentric wheel apparatus for a rocking bicycle will be described below. A front drive wheel 10 having a center Sa located at a position distant by a certain distance from a circumferential center of a rear wheel (not shown) is connected with the rear wheel by means of a number of spokes 3 having different lengths. An intermediate wheel 40 is connected with a right-hand wheel 20 and a left-hand wheel 30 by means of a bolt 11. A number of chain sprockets 12 whose teeth become small sequentially from the concentrical axis with respect to a center 5a which is congruent with the center of a joint shaft 5 are connected with the outer surface of the right-hand wheel 20 located at a position of the center 5a. A shaft hole 12a whose center is congruent with the center 5a is formed on the center of the chain sprockets 12. An inner circumferential portion 21 having a certain height is protrudingly installed in the inner side of the right-hand wheel 20. A spur gear 22 having a certain pitch and a certain number of teeth is formed along the inner circumferential portion 21 in the inner side of the inner circumferential portion 21. A screw coupling unit 24 whose an inner side is formed of a female screw 23 is protrudingly installed at a certain position of the inner side surface of the right-hand wheel 20. A spring 25 giving an elastic force is wound around the outer circumferential portion of the screw coupling unit 24. The left-hand wheel 30 which is engaged with the screw coupling unit 24 protruded in the right-hand wheel 20 by means of a bolt 11 also includes a spur gear 22a having the same pitch and teeth as those of the spur gear 22 formed in the right-hand wheel 20 which is formed along an inner circumferential portion 31 in the inner side of the inner circumferential portion 31 of the left-hand wheel 30 in correspondence to the spur gear 22. The joint shaft 5 is inserted into the shaft hole 12a of the chain sprocket 12 formed in the right-hand wheel 20. The intermediate wheel 40 is installed between the right-hand wheel 20 and the left-hand wheel 30 to make the right-hand wheel 20 and the left-hand wheel 30 coupled with or separated from each other. A number of small or large spokes 3 are integrally installed in an outer circumferential portion 41 of the intermediate wheel 40. A spur gear 22b and a spur gear 22c which have the same tooth-shapes as those of the spur gears 22 and 22a are formed in the inner side of the outer circumferential portion 41 in correspondence to each other, in a manner that the spur gear 22 and the spur gear 22a which are formed in the right-hand wheel 20 and the left-hand wheel 30, respectively, can be engaged with each other. Accordingly, the spur gears 22, 22a, 22b, and 22c can be engaged with one another. The bolt 11 in the left-hand wheel 30 is screw-connected with the screw coupling unit 24 in the right-hand wheel 20. Bearings 6 and 6a are installed at the left and right ends of the joint shaft 5, respectively. Accordingly, the front drive wheel 10 in which the right-hand wheel 20, the intermediate wheel 40 and the left-hand wheel 30 are coupled with one another can be smoothly rotated according to rotation of the chain sprockets 12. A rear frame 4 is axially installed and screw-connected with nuts (not shown).

However, the conventional rocking bicycle having an eccentric wheel apparatus includes the right-hand wheel 20 and the left-hand wheel 30 which are engaged with the intermediate wheel 40 by means of the spur gears 22, 22a, 22b, and 22c to play a role of the front drive wheel 10, and assembled with one another by means of the bolt 11 and the screw coupling unit 24. Accordingly, since the right-hand wheel 20 and the left-hand wheel 30 should be engaged with each other centering on the intermediate wheel 40, a strong engagement force should be required for the right-hand wheel 20, the left-hand wheel 30, and the intermediate wheel 40. However, the tightening length of the bolt 11 is limited since the bolt 11 should be positioned at the inner side of a brake in view of the structures in thickness of the wheels, and thus the trifold engagement structure among the right-hand wheel 20, the left-hand wheel 30, and the intermediate wheel 40 cannot be firmly tightened. As a result, the trifold engagement structure may be released during running.

In addition, the spur gears 22, 22a, 22b, and 22c should be formed in the left-hand wheel 30, the inner side of the right-hand wheel 20, and both sides of the intermediate wheel 40, which pushes a production cost to rise. Further, since the assembly bolt 11 which assembles the left-hand wheel 30, the right-hand wheel 20, and the intermediate wheel 40 is small-sized, it may be released or lost. In this case, since the trifold engagement structure is broken, the wheels may be separated during running to thereby cause danger.

DISCLOSURE OF INVENTION

Technical Problem

To solve the above problems, it is an object of the present invention to provide an eccentric wheel apparatus for a rocking bicycle which employs an engagement structure of the eccentric wheel apparatus so as to be firmly assembled not by a conventional trifold engagement structure but by a new adjustment structure.

It is another object of the present invention to provide an eccentric wheel apparatus for a rocking bicycle including a ratchet and a ratchet gear for preventing danger due to secession and release so that an eccentrically adjusted rotating frame and an eccentrically adjusted wheel frame are not separated.

It is still another object of the present invention to provide an eccentric wheel apparatus for a rocking bicycle which newly supplements an elastic member for providing an elastic force when the conventional rotating frame and wheel frame which are elastically supported are coupled with or separated from each other.

Technical Solution

To accomplish the above objects of the present invention, according to an aspect of the present invention, there is provided an eccentric wheel apparatus for a rocking bicycle, comprising: a driving shaft; a rotating frame of a cylindrical body which includes an isolation plate by which the inner portion thereof is isolated, an axial tube to which the driving shaft is fixed and is eccentrically formed via the isolation plate, a spiral which is formed on the outer circumferential portion of the cylindrical body, an extension portion of a "C"-shaped cross-section which is formed at one end thereof, wherein ring-shaped grooves are formed at the inner side thereof and an unevenness portion is formed at the outer side thereof; a ring-shaped wheel frame which includes a ring-shaped outer circumferential portion where connection units each having a connection hole are formed along the outer side thereof and where a circular plate is rivet-connected with wheel rims, an opening space formed in the inner side of the outer circumferential portion thereof, a ring-shaped insertion support circumferential portion and a ring-shaped groove portion which are formed in the inner wall of the opening space, and an unevenness portion formed on the bottom of the groove portion in correspondence to the unevenness portion; and a circular adjustment member of a cylindrical body which is inserted from the other side of the wheel frame, including a corresponding spiral which is threadedly engaged with the rotating frame, and a circular extension portion formed at the outer side of one end thereof, wherein the rotating frame and the adjustment member are eccentrically adjusted so as to be threadedly engaged with or separated from each other at the left and right sides of the opening space in the wheel frame.

Preferably, the eccentric wheel apparatus includes a ratchet which is elastically supported by a torsion spring at a predetermined position of the wheel frame and forms a contact, and a ratchet gear formed in the extension portion of the adjustment member so as to elastically abut the contact.

Preferably, the eccentric wheel apparatus includes elastic insertion holes formed from the outer side of the extension portion in the rotating frame to the inner side thereof, a coil spring, a contact ball and a bolt which are internally fixed in the elastic insertion holes, and elastic insertion grooves which slidingly contact the insertion support portion at the ends of the elastic insertion holes in which contact balls are mounted.

Preferably, the eccentric wheel apparatus further includes a cover member instead of a bolt for supporting the coil spring to be inserted into an elastic hole.

Advantageous Effects

As described above, the present invention provides an eccentric wheel apparatus for a rocking bicycle according to the present invention has improved problems having occurred in the conventional eccentric wheel apparatus in which tooth-engagement is stably achieved when a rotating frame and a wheel frame which are integrally combined with a driving shaft are eccentrically adjusted, and angular adjustment is simply achieved. Also, the eccentric wheel apparatus according to the present invention maximizes a tooth-engagement capability corresponding to running of a bicycle, as well as a tightening capability, to thereby heighten utility.

Also, the eccentric wheel apparatus according to the present invention prevents release or secession, to thereby prevent an accident which can take place when an engagement state is released or seceded during running of a bicycle.

BRIEF DESCRIPTION OF THE DRAWINGS

The above and other objects and advantages of the present invention will become more apparent by describing the preferred embodiments thereof in detail with reference to the accompanying drawings in which:

FIG. 1 is a side view showing an example of a conventional rocking bicycle;

FIG. 2 is an exploded view showing a conventional eccentric wheel apparatus for a rocking bicycle;

FIG. 3 is a cross-sectional view showing a conventional eccentric wheel apparatus for a rocking bicycle;

FIG. 4 is an enlarged perspective view of a rear wheel in which an eccentric wheel apparatus for a rocking bicycle according to a first embodiment of the present invention is employed;

FIG. 5 is an exploded perspective view showing an eccentric wheel apparatus for a rocking bicycle according to a first embodiment of the present invention;

FIGS. 6 and 7 are longitudinal cross-sectional views showing functions of the eccentric wheel apparatus for a rocking bicycle according to the first embodiment of the present invention, respectively;

FIG. 8 is an exploded perspective view showing an eccentric wheel apparatus for a rocking bicycle according to a second embodiment of the present invention;

FIGS. 9 through 12 are front views for explaining an up-movement or a down-movement of a rear wheel according to an eccentric position of each embodiment of the eccentric wheel apparatus for a rocking bicycle according to the present invention;

FIG. 13 is an exploded perspective view showing an eccentric wheel apparatus for a rocking bicycle according to a third embodiment of the present invention; and FIG. 14 is a cross-sectional view for explaining functions of the eccentric wheel apparatus for a rocking bicycle according to the third embodiment of the present invention.

BEST MODE FOR CARRYING OUT THE INVENTION

Hereinbelow, an eccentric wheel apparatus for a rocking bicycle according to a preferred embodiment of the present invention will be described with reference to the accompanying drawings.

FIG. 4 is an enlarged perspective view of a rear wheel in which an eccentric wheel apparatus for a rocking bicycle according to a first embodiment of the present invention is employed, and FIG. 5 is an exploded perspective view showing an eccentric wheel apparatus for a rocking bicycle according to a first embodiment of the present invention.

Referring to FIGS. 4 and 5, the eccentric wheel apparatus for a rocking bicycle according to the present invention includes a rotating frame 110 in which a driving shaft D is installed, a wheel frame 120, and a circular adjustment member 130 which couples and adjusts the rotating frame 110 and the wheel frame 120.

The eccentric wheel apparatus for a rocking bicycle according to the present invention will be described with respect to a case applied to a rear wheel. However, the eccentric wheel apparatus according to the present invention can be applied to a front wheel. Also, the eccentric wheel apparatus according to the present invention can be applied to an indoor exercise bicycle-related training facility as well as a general bicycle. Hereinbelow, an eccentric wheel apparatus which is applied to a rear wheel for a bicycle will be described.

A rotating frame 110 of a cylindrical body includes an isolation plate 119 by which the left and right sides of the inner portion thereof are isolated. An axial tube 115 having a throughhole 114 to which the driving shaft D is penetratively fixed on a screw connection basis is eccentrically formed via the isolation plate 119. A spiral 116 is formed on the outer circumferential portion of the cylindrical body 113 of the cylindrical body. An extension portion 111 of a "C"-shaped cross-section is bent and extended at one end thereof. Here, ring-shaped grooves 117 are formed at the inner side of the extension portion 111 and an unevenness 112 is formed at the outer side thereof.

Also, an elastic insertion hole 118 is formed in each groove 117 of the extension portion 111 in the rotating frame 110. A coil spring 142 and a contact ball 144 are elastically fitted into the elastic insertion hole 118. Then, a cover member 160 in which a throughhole 162 with which the throughhole 114 communicates, and fixing holes 164 are formed are attached and fixed on the end of the rotating frame 110 with a fixing unit 161, to thereby prevent the coil spring 142 from being seceded. Thus, the contact ball 144 is exposed to the end of the elastic insertion hole 118 and is safely mounted into a groove 126a of a insertion support circumferential portion 126 to be described later. This is released by a release of an adjustment member 130.

The wheel frame 120 includes a ring-shaped outer circumferential portion 128 where a number of connection units 129 each having a connection hole 128 are formed along the outer side thereof and where a circular plate C is rivet-connected with wheel rims G, an opening space 124 formed in the inner side of the outer circumferential portion thereof 121, a ring-shaped insertion support circumferential portion 126 and a ring-shaped groove portion 125 which are formed in the inner wall of the opening space 124, and an unevenness portion 122 formed on the bottom of the groove portion 125 in correspondence to the unevenness portion 112.

The insertion support circumferential portion 126 includes a groove 126a in which the contact ball 144 is intermittently mounted. A ratchet 150 is elastically installed together with a torsion spring 156 at one side of the outer circumferential portion 121. The central portion of the ratchet 150 is rotatably hinged with and fixed to a fixing unit 123. On one of the ratchet 150 is formed a contact 152, and on the other end thereof is formed a release piece 154.

An adjustment member 130 of a short cylindrical body 135 includes an opening space 131 at the inner side of the cylindrical body 135. A corresponding spiral 134 which corresponds to the spiral 116 of the outer circumferential portion of the cylindrical body 113 in the rotating frame 110 is inscribed and formed in the opening space 131. A ring-shaped extension portion 132 is formed in the outer circumferential portion of one end of the rotating frame 110. A ratchet gear 133 is formed in the extension portion 132 and is elastically released or engaged by means of a contact 152 of the ratchet 150.

If an adjustment member 130 is assembled at the state where the ratchet 150 is rotatably fixed, the contact 152 elastically abuts the ratchet gear 133 formed at the extension portion 132 in the adjustment member 130, to thus prevent the adjustment member 130 from reversely rotating.

In the case of the eccentric wheel apparatus for a rocking bicycle according to the present invention having the above-described structure, the outer circumferential portion of the cylindrical body 113 in the rotating frame 110 is inserted at one side of the wheel frame 120 and screw-coupled with an inscribed screw 134 of the adjustment member 130 at the other side thereof.

Here, the unevenness portion 112 in the rotating frame 110 is engaged with the unevenness portion 122 in the wheel frame 120 in correspondence to each other. Simultaneously, the contact ball 144 is mounted into the groove 126a and the contact 152 of the ratchet 150 is elastically supported by the ratchet gear 133.

Functions of the eccentric wheel apparatus for a rocking bicycle according to the present invention will be described below with reference to the accompanying drawings.

FIG. 6 is a longitudinal cross-sectional view showing eccentrical functions of the eccentric wheel apparatus for a rocking bicycle according to the first embodiment of the present invention, which shows a coupled state immediately after coupling, and FIG. 7 is a longitudinal cross-sectional view showing eccentrical functions of the eccentric wheel apparatus for a rocking bicycle according to the first embodiment of the present invention, which shows a release state where a coupled state has been released.

In the eccentric wheel apparatus for a rocking bicycle according to the first embodiment of the present invention, the rotating frame 110 fixed to the driving shaft D receiving a driving force from a pedal is coupled with the wheel frame 120 which is connected with the circular plate C in the rear wheel of a bicycle. To do this, the rotating frame 110 and the adjustment member 130 are assembled in a screw connection manner in which the wheel frame 120 is interposed between the rotating frame 110 and the adjustment member 130. Accordingly, primary coupling of the rotating frame 110, the wheel frame 120 and the adjustment member 130 is achieved.

As shown in FIG. 6, the outer circumferential portion of the cylindrical body 113 in the rotating frame 110 is inserted at one side of the wheel frame 120 and screw-coupled with an inscribed screw 134 of the adjustment member 130 at the other side thereof. Here, the unevenness portion 112 in the rotating frame 110 is engaged with the unevenness portion 122 in the wheel frame 120 in correspondence to each other. Simultaneously, the contact ball 144 is mounted into the groove 126a and the contact 152 of the ratchet 150 is elastically supported by the ratchet gear 133.

This assembly is achieved after a shaking width has been determined in the eccentric wheel apparatus for a rocking bicycle according to the present invention.

In FIG. 7, a screw coupled and assembled state of the adjustment member 130 is released by a predetermined distance at the state where a release piece 154 of the ratchet 150 has been pressed. That is, as shown in FIG. 7, a distance "a" is formed between the unevenness portion 112 and the unevenness portion 122.

Thus, since the unevenness portion 112 of the rotating frame 110 is seceded from the unevenness portion 122 of the wheel frame 120 located in the opening space 124 in the wheel frame 120, the wheel frame 120 is rotated to thus make an assembly angle of the wheel frame 120 freely set.

FIG. 8 is an exploded perspective view showing an eccentric wheel apparatus for a rocking bicycle according to a second embodiment of the present invention, in which headless bolts 141 are applied instead of the cover member 160 of the first embodiment of the present invention.

That is, elastic insertion holes 118 are formed in grooves 117 in an extension circumferential portion 111, respectively. A contact ball 144 and a coil spring 142 are elastically inserted into each elastic hole 118 in sequence. After the coil spring 142 has been elastically inserted into the elastic hole 118, the rear side of the coil spring 142 is fixed by means of a headless bolt 141, to thus prevent the coil spring 142 from being seceded in the rear direction. Accordingly, the contact ball 144 is protrudingly inserted into the groove 126a in the insertion support circumferential portion 126, and at the end of the elastic insertion hole 118.

Referring to FIGS. 9 through 12, an eccentricity adjustment ratio of a rotating angle in the eccentric wheel apparatus for a rocking bicycle according to the first and second embodiments of the present invention will be described below. FIGS. 9 through 12 are front views for explaining an up-movement or a down-movement of a rear wheel according to an eccentric position of each embodiment of the eccentric wheel apparatus for a rocking bicycle according to the present invention. Referring to FIGS. 9 through 12, an eccentricity adjustment ratio of a rotating angle in the eccentric wheel apparatus for a rocking bicycle according to the first and second embodiments of the present invention is expressed as a ratio of a longest distance L1 and a shortest distance L2 from the center of the driving shaft D to the outer side of a bicycle wheel H. This eccentricity length ratio is varied according to a rotational angle of a bicycle wheel H which is eccentrically fixed to the wheel frame 120 at the state where the unevenness portion 112 of the rotating frame 110 and the unevenness portion 122 of the wheel frame 120 are separated from each other.

In FIG. 9, since the center S1 of the bicycle wheel H is congruent with the center S2 of the driving shaft D, a ratio of the longest distance L1 and the shortest distance L2 is one to one (1:1). This represents the bicycle wheel of FIG. 9 is at the same state as that of a general bicycle.

In FIG. 10, the bicycle wheel H is rotated by about 30 degrees. In this case, the wheel frame 120 eccentrically fixed to the bicycle wheel H is rotated around the rotating frame 110. Accordingly, the center S2 of the driving shaft D is discrepant from the center S1 of the wheel H. That is, a ratio of the longest distance L1 and the shortest distance L2 is varied into five point six to four point four (5.6:4.4).

In FIG. 11, the bicycle wheel H is rotated by about 60 degrees. In this case, the wheel frame 120 is rotated around the rotating frame 110 to which the driving shaft D is eccentrically fixed. Accordingly, the center S1 of the wheel H is discrepant from the center S2 of the driving shaft D. That is, a ratio of the longest distance L1 and the shortest distance L2 is varied into six to four (6:4).

In FIG. 12, the bicycle wheel H is rotated by about 90 degrees. In this case, the wheel frame 120 is rotated around the rotating frame 110 to which the driving shaft D is eccentrically fixed. Accordingly, the center S1 of the wheel H is discrepant at maximum from the center S2 of the driving shaft D. That is, a ratio of the longest distance L1 and the shortest distance L2 is varied into six point two to three point eight (6.2:3.8).

As described above, if the adjustment member 130 is rotated in the tightening direction at the state where a shaking width has been adjusted while rotating the wheel frame 120, the wheel frame 120 moves at the inner side thereof so that the unevenness portion 122 and the unevenness portion 112 are coupled with each other. Accordingly, the rotational force transferred from the driving shaft D fixed to the throughhole 114 of the rotating frame 110 makes the wheel frame 120 rotate. As a result, the wheel frame 120 rotates and the driving shaft D proceeds while being shaken at a predetermined width.

As described above, the ratio of the longest distance L1 and the shortest distance L2 from the center of the driving shaft D to the outer side of the bicycle wheel H has been described as an example in the above-described embodiments of the present invention. However, the present invention is not limited to the above-described ratio, but can be varied into an eccentricity ratio which is determined according to a fixed position of the wheel frame 120 which is eccentrically fixed from the center of the bicycle wheel H.

FIG. 13 is an exploded perspective view showing an eccentric wheel apparatus for a rocking bicycle according to a third embodiment of the present invention, and FIG. 14 is a cross-sectional view for explaining functions of the eccentric wheel apparatus for a rocking bicycle according to the third embodiment of the present invention.

Referring to FIGS. 13 and 14, the eccentric wheel apparatus for a rocking bicycle according to the third embodiment of the present invention eccentrically transfers the rotational force of a driving shaft which receives a driving force from a pedal of a bicycle to a bicycle wheel, to thus make the bicycle shaken, and includes a rotating frame 210 fixed to the driving shaft D, a wheel frame 220 which receives a rotational force from the rotating frame 210 and makes the bicycle wheel eccentrically rotate, an adjustment member 230 which couples or separates the rotating frame 210 and the wheel frame 220 with or from each other, and a cushion member 240 which is elastically inserted between the rotating frame 210 and the wheel frame 220.

The rotating frame 210 of a cylindrical body 213 includes an isolation plate 219 by which the inner portion of the cylindrical body 213 is halved. An axial tube 215 having a through-hole 214 to which the driving shaft D is penetratively fixed on a screw connection basis is eccentrically formed via the isolation plate 219. A spiral 216 is formed on the inner circumferential portion formed at one side of the isolation plate 219 and at one end of the cylindrical body 213, and an unevenness portion 212 are formed along the edges of the spiral 216. An extension portion 211 of a "C"-shaped cross-section is bent and extended at the other end of the cylindrical body 213. Here, a groove 217 is formed at the inner side of the extension portion 211 which is coupled with an unevenness portion 222 to be described later.

The wheel frame 220 is a cylindrical body 223 forming a ring-shaped outer circumferential portion 221 as an H-shaped cross-section where a number of connection holes 228 are formed on a circular plate C between wheel rims. A groove 226 is formed at the inner side of the outer circumferential portion of one side of the cylindrical body 223. The extension portion 211 is inserted into the groove 226. A ring-shaped extension portion 225 is formed at the inner side of the outer circumferential portion of the other side thereof. Here, an unevenness portion 222 is formed in correspondence to the unevenness portion 212, in which the unevenness portion 212 is coupled with or separated from the unevenness portion 222 during assembly.

The adjustment member 230 is formed as an extension portion 232 of a circular plate shape in which one end of a short cylindrical body 233 is bent at the outer side thereof. An opening space 231 is formed at the inner side of the adjustment member 230. A spiral 236 is formed on the outer circumferential portion of the cylindrical body 233 in correspondence to the spiral 216 in the rotating frame 210.

The cushion member 240 is elastically supported between the groove 226 in the wheel frame 220 and the groove 217 in the rotating frame 210. Accordingly, when the adjustment member 230 and the rotating frame 210 are screw-coupled with each other, the unevenness portions 212 and 222 of the wheel frame 230 and the rotating frame 210 are elastically coupled with each other. Thus, when the adjustment member 230 is released, the wheel frame 220 and the rotating frame 210 can be easily separated from each other.

In the case of the eccentric wheel apparatus for a rocking bicycle according to the third embodiment of the present invention having the above-described structure, as shown in FIG. 14, the outer circumferential portion of the cylindrical body 213 in the rotating frame 210 is inserted at one side of the wheel frame 220 and is screw-coupled with a screw 236 of the adjustment member 230 at the other side thereof. Here, the unevenness portion 212 in the rotating frame 210 is integrally engaged with the unevenness portion 222 in the wheel frame 220 in correspondence to each other.

Thus, a rotational force from a pedal of a bicycle is transferred to the wheel frame 220 via the rotating frame 210 fixed to the driving shaft D and the unevenness portions 212 and 222 in the wheel frame 220. As a result, the wheel frame 220 performs predetermined rotation, as well as predetermined shaking and running.

Dotted lines shown in FIG. 14 schematically show a state before the eccentric wheel apparatus has been assembled. That is, the dotted lines in FIG. 14 show a state that the adjustment member 230 has been released by a certain distance from a screw coupled or assembled state. In this state, a distance between the unevenness portions 212 and 222 is formed.

Thus, the unevenness portion 212 in the rotating frame 210 located in the opening space 224 in the wheel frame 220 is separated from the unevenness portion 222 in the wheel frame 220, at this state where the distance between the unevenness portions 212 and 222 is formed. As a result, if the wheel frame 220 is freely adjusted and then a coupling position of the rotating frame 210 and the wheel frame 220 is determined, that is, if an up- and down-movement width is determined, the adjustment member 230 can be screw-coupled and tightened.

Since the adjustment function of the up- and down-movement width is same as those described with reference to FIGS. 9 through 12 in the above-described embodiments of the present invention, the detailed description of the adjustment function will be omitted.

As described above, if the wheel frame 220 and the rotating frame 210 are coupled with each other via the unevenness portions 212 and 222, the rotational force transferred from the driving shaft D fixed to the throughhole 214 in the rotating frame 210 makes the eccentric wheel frame 220 rotate and shaken up and down and proceed by a width of the eccentric driving shaft D.

MODE FOR THE INVENTION

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

As described above, the present invention provides an eccentric wheel apparatus for a rocking bicycle.

The invention claimed is:

1. An eccentric wheel apparatus for a rocking bicycle, comprising:
   a driving shaft (D);
   a rotating frame (110) of a cylindrical body (113) which includes an isolation plate (119) by which the inner portion thereof is isolated, an axial tube (115) to which the driving shaft (D) is fixed and is eccentrically formed via the isolation plate, a first spiral (116) which is formed on the outer circumferential portion of the cylindrical body (113), an extension portion (111) of a "C"-shaped cross-section which is formed at one end thereof, wherein ring-shaped grooves (117) are formed at the inner side thereof and a first unevenness portion (112) is formed at the outer side thereof;
   a ring-shaped wheel frame (120) which includes a ring-shaped outer circumferential portion (121) where connection units (129) each having a connection hole (128) are formed along the outer side thereof and where a circular plate (C) is rivet-connected with wheel rims (G), an opening space (124) formed in the inner side of the outer circumferential portion (121) thereof, a ring-shaped insertion support circumferential portion (126) and a ring-shaped groove portion (125) which are formed in the inner wall of the opening space (124), and a second unevenness portion (122) formed on the bottom of the groove portion (125) in correspondence to the first unevenness portion (112); and
   a circular adjustment member (130) of a cylindrical body (135) which is inserted from the other side of the wheel frame (120), including a corresponding second spiral (134) which is threadedly engaged with the rotating frame (110), and a circular extension portion (132) formed at the outer side of one end thereof,
   wherein the rotating frame (110) and the adjustment member (130) are eccentrically adjusted so as to be threadedly engaged with or separated from each other at the left and right sides of the opening space in the wheel frame (120).

2. The eccentric wheel apparatus according to claim 1, further comprising a ratchet (150) which is elastically supported by a torsion spring (156) at a predetermined position of the wheel frame (120) and forms a contact (154), and a ratchet gear (133) formed in the extension portion (132) of the adjustment member (130) so as to elastically abut the contact (154).

3. The eccentric wheel apparatus according to claim 1, further comprising elastic insertion holes (118) formed from the outer side of the extension portion (111) in the rotating frame (110) to the inner side thereof; a coil spring (142), a contact ball (144) and a bolt (141) which are internally fixed in the elastic insertion holes (118); and elastic insertion grooves (126a) which slidingly contact the insertion support circumferential portion (126) at the ends of the elastic insertion holes (118) in which contact balls (144) are mounted.

4. The eccentric wheel apparatus according to claim 1, further comprising a cover member (160) supporting a coil spring (142).

5. An eccentric wheel apparatus for a rocking bicycle, comprising:
   a driving shaft (D);
   a rotating frame (210) of a cylindrical body (213) which includes an isolation plate (219) by which the inner portion thereof is isolated, an axial tube (215) to which the driving shaft (D) is fixed and is eccentrically formed via the isolation plate, a first unevenness portion (212) formed at one end of the isolation plate (219), a first spiral (216) formed in the inner circumferential portion thereof, and an extension circumferential portion (211) of a "C"-shaped cross-section formed at the other side thereof, in which a ring-shaped first groove (217) is formed at the inner side thereof;
   a wheel frame (220) including a circumferential portion (223) where connection holes (228) into which a circular plate (C) is rivet-connected between wheel rims (G) formed in parallel with the inner and outer sides thereof, an opening space (224) formed in the inner side of the circumferential portion (223) thereof, a second groove portion (226) which is bent and formed in part of the inner wall of the opening space (224), and an extension portion (225) formed by bending the end of the other side thereof to the inner side thereof and a second unevenness portion (222); and an adjustment member (230) of a cylindrical body (233) including a second spiral (236) which corresponds to the first spiral (216) formed on the inner circumferential portion of the rotating frame (210), and a circular extension portion (232) formed at the outer side of one end thereof, wherein the adjustment member (230) is screw-coupled with the rotating frame (210) at the left and right sides of the opening space (224) in the wheel frame (220) and simultaneously the first and second unevenness portions (212 and 222) are coupled with each other, in which a cushion member (240) is interposed between the first groove (217) in the rotating frame (210) and the second groove (226) in the wheel frame (220).

\* \* \* \* \*